Figure 4:
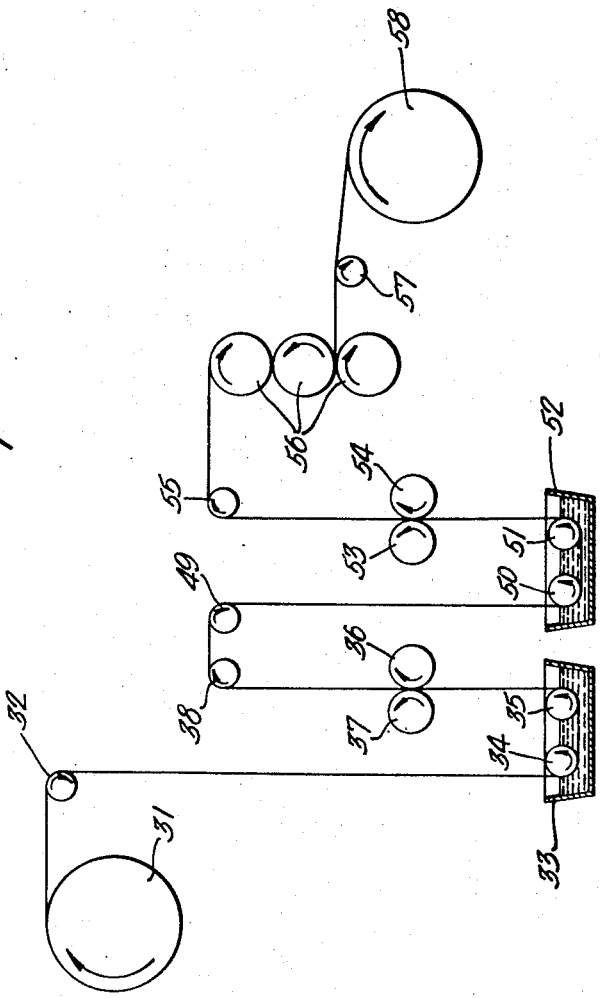

Feb. 18, 1947.  F. J. SODAY  2,416,232
COATED ORGANIC MATERIAL AND METHOD OF MAKING THE SAME
Filed April 3, 1943  2 Sheets-Sheet 1
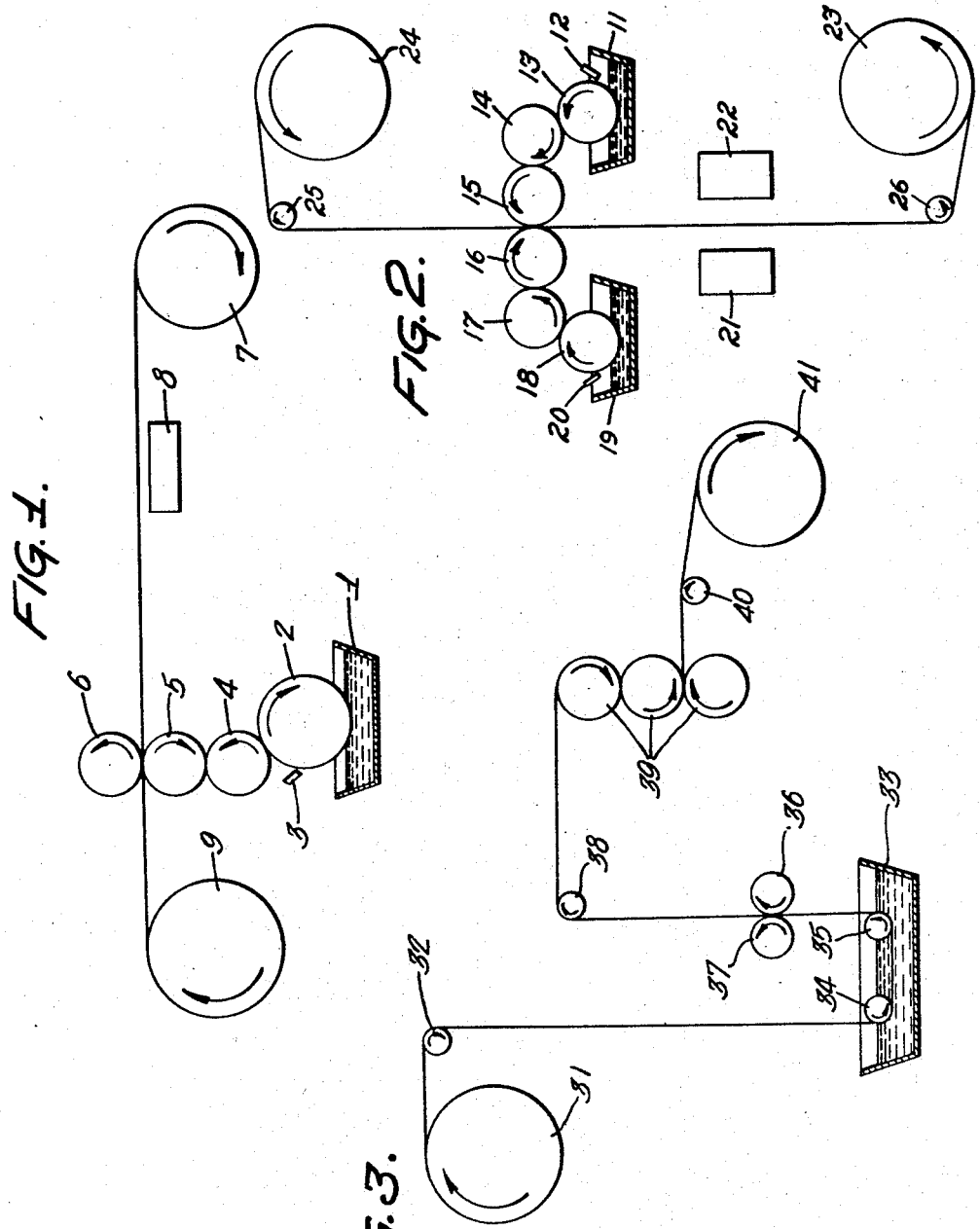
Inventor:
Frank J. Soday
by his Attorney
Hugo A. Kemman Feb. 18, 1947. F. J. SODAY 2,416,232
COATED ORGANIC MATERIAL AND METHOD OF MAKING THE SAME
Filed April 3, 1943 2 Sheets-Sheet 2

Inventor:
Frank J. Soday
by his Attorney
Hugo A. Kenman

Patented Feb. 18, 1947

2,416,232

UNITED STATES PATENT OFFICE 2,416,232

COATED ORGANIC MATERIAL AND METHOD OF MAKING THE SAME

Frank J. Soday, Baton Rouge, La., assignor to The United Gas Improvement Company, a corporation of Pennsylvania Application April 3, 1943, Serial No. 481,742

3 Claims. (Cl. 117—65)

The present invention relates to a coated or impregnated product and to the method of making the same, and more particularly it relates to a product comprising an organic material, preferably absorbent, coated or impregnated with a butadiene resin applied in the form of an emulsion.

A principal object of the invention is the provision of an organic material, such as paper, cardboard, textiles, leather, straw plait, and the like, coated or impregnated with a butadiene resin, preferably applied in the form of an aqueous butadiene resin emulsion, so that advantageous properties will be imparted thereto, widening the field of use of such products.

Still another object of the present invention is to furnish a product of the type described which will be characterized by resistance to mechanical abrasion and stresses, and resistant to attack by chemical or physical corrosive agents.

A further object of the present invention is to provide an organic fibrous product having a high gloss or finish and improved crease-proofing or crush-proofing qualities.

Other objects of the invention, including the provision of a novel and economical method of preparing the products heretofore described will be apparent from a consideration of the specification and claims.

In the drawings, there is illustrated diagrammatically suitable methods for treating organic materials with an aqueous butadiene resin emulsion.

The term "organic material" as employed herein includes various materials of the character of wood pulp, paper, cardboard, textile fibres, both natural and synthetic, fabricated textile products made therefrom, burlap, felt, jute, leather, artificial leather, artificial rubber, molded, cast, machined, or extruded plastic products, straw plait, and the like. Usually the organic material treated by the aqueous butadiene resin emulsion will be somewhat absorbent, and whether the particular product is coated or impregnated, or both, with the resin will depend on the conditions of treatment and the nature of the organic material treated. Individual organic fibers may be treated with an aqueous butadiene resin emulsion in accordance with the present invention and thereafter formed into any desired fabricated product; or products such as woven, knitted, felted, or other formed or fabricated articles may be treated with the emulsion.

Where the term "organic fiber" is used herein without qualification, it includes the fabricated product as well as the individual fibers, and the term "fabricated product" includes products made by weaving, knitting, felting, or otherwise manipulating the organic fibers to form an article or product. Paper, for example, is a fabricated product since it is prepared by felting the paper-making fibers.

The present invention is particularly advantageous for use in the preparation of paper and paper products, felted articles, and textiles, and the invention will be described using these materials as illustrative of the various materials which may be treated in accordance herewith.

It is to be understood, of course, that solutions of resins of the type described herein in organic, and more particularly hydrocarbon, solvents may be used to coat, impregnate, and/or saturate organic fibers and organic fiber products, and that such solutions may contain other coating ingredients.

In addition, the resin may be melted by the application of heat and applied to organic fiber and organic fiber products in the complete, or substantially complete, absence of water and/or solvents.

However, the use of aqueous emulsions of resins of the type described are preferred for many coating, impregnating, and/or saturating operations, consequently the invention will be largely discussed from the standpoint of the use of such emulsions.

The aqueous butadiene resin emulsions employed in the treatment of the organic materials, in accordance with the present invention, are described and claimed in my copending application Serial No. 481,295, filed March 31, 1943, and the disclosure of that application is included herein by reference.

As pointed out in said copending application, the resinous polymers employed in the preparation of the emulsions may result from the polymerization of butadiene alone or in the presence of lesser quantities of other unsaturated and/or reactive hydrocarbons, such resinous polymers being referred to herein as butadiene resins. Preferably a soluble resinous polymer is employed which is truly resinous in character, as distinguished from rubber-like polymers. Resins of the type described differ from synthetic rubber in that they possess a definite and reproducible softening point, and are compatible with drying oils. In addition, they cannot be vulcanized by any of the methods usually employed for this purpose in the rubber industry.

The resinous polymers employed in the production of the aqueous emulsions used herein may have any desired softening point which may range all the way from relatively high temperatures down to relatively low temperatures. Accordingly, the particular butadiene resin employed may have a softening point above, below or at room temperature, although softening points of at least 60° C. are preferred.

Generally speaking, when the starting material is butadiene in the substantial absence of other unsaturated and/or reactive material, and when a metallic halide catalyst is employed, the resulting resinous polymer has a substantially elevated softening point.

The same is true when certain selected olefines are present.

This does not hold true, however, in the case of certain olefines which normally occur in the presence of butadiene in hydrocarbon fractions resulting from the pyrolytic decomposition of petroleum oil such as takes place, for instance, in the manufacture of oil gas, carburetted water gas, or in the manufacture of motor fuels.

In certain instances the character of the olefines present, even though reduced to as low as 5% of the unsaturates present, is such as to result in the production of resinous polymers which do not possess the desired characteristics.

I have discovered a new method for the production of resinous butadiene polymers from the foregoing hydrocarbon fractions, which polymers have the desired physical properties. This process is more particularly described and claimed in my copending application Serial Number 476,636, filed February 20, 1943, and comprises treating butadiene fractions derived from the sources indicated and boiling between approximately $-25$ to $+25°$ C. with boron trifluoride as distinguished from all other catalysts of this type at a temperature below $-10°$ C. and preferably below $-20°$ C. Excellent results are obtained when polymerizing temperatures below $-50°$ C. and more preferably below $-60°$ C. are employed. Aromatic hydrocarbons, such as benzene, toluene, and xylene, may be added and may take part in the polymerization.

The use of butadiene resins resulting from the process of my last mentioned copending application are preferred herein.

Satisfactory resins for use in the preparation of the emulsions also may be obtained when butadiene is polymerized with certain selected olefins, particularly aliphatic olefins, or when butadiene is polymerized in the presence of benzene, toluene, xylene, or high boiling aromatic hydrocarbons, either with or without the addition of olefin hydrocarbons, using an acid-acting metallic halide such as aluminum chloride as a catalyst. When aromatic hydrocarbons are present during polymerization, the quantity which takes part in the reaction and becomes a part of the resin usually is less than 5% of the resin, the rest, if any, acting for the most part as diluent.

Other diolefins, in addition to butadiene, such as isoprene, may be present if desired, in which event, butadiene preferably comprises at least the major portion of the diolefin content, and usually preferably comprises 90 per cent or more of the total diolefins present; but satisfactory resins have been obtained using a mixture of diolefins where the butadiene content was 75 per cent or less, based on the total diolefin content.

In general, when forming resins of the type described, the unsaturated hydrocarbons usually comprise from 10 per cent to 80 per cent by weight of the total material present, butadiene preferably comprising at least 50% of the said unsaturated hydrocarbons and being the preponderating unsaturated hydrocarbon present.

The polymerization is advantageously carried out in the presence of a halide-containing catalyst, such as an acid-acting metallic halide, metallic halide-organic solvent complex, ansolvo acid, and the like, the quantity of catalyst usually ranging from 0.1 per cent to 5.0 per cent by weight of the total unsaturated and reactive compounds present.

The temperature may advantageously range from $-100°$ C. to $+60°$ C., and the time of reaction may vary from one to ten hours.

After the polymerization has been completed, the catalyst preferably is removed by neutralization by means of an aqueous alkaline solution, or otherwise, after which the unpolymerized material present may be removed, among other ways, by distillation under reduced pressure, which may be assisted with steam.

Although I have particularly set forth convenient and preferred methods of forming the butadiene resin to be used in the preparation of the butadiene resin emulsion employed herein, particularly when other unsaturated and/or reactive hydrocarbons are present with the butadiene during the polymerization, it is to be understood that broadly speaking the butadiene resin may be derived from any source, particularly if its softening point is above atmospheric temperatures. However, it should be pointed out that in certain paper and textile applications, butadiene resins having melting points below room temperature may be employed.

The resinous emulsion employed in accordance with the present invention is a resin-in-water emulsion.

In the preparation of an aqueous butadiene resin emulsion, a mixture of water and resin is violently agitated with a view of maintaining one phase in a state of minute subdivision, the other phase coalescing to form the continuous phase. As the stability of the emulsion finally obtained is in large measure proportional to the degree of subdivision of the dispersed phase, it is apparent that efficient agitation should preferably be employed in order to insure the desired fineness of the dispersed phase.

Any suitable agitating or stirring device may be employed in forming the emulsion, and very satisfactory emulsions have been obtained by the use of the so-called colloid mills.

The emulsion may be formed by a dry process, a wet process, or a combination of the two, as described in my first-mentioned copending application.

In the dry process, the resin is reduced to a powder of the desired degree of fineness, after which it is emulsified by any suitable method and at any desired temperature, for instance, at room temperature. In general this type of emulsification requires the use of a very efficient stirring or agitating device in order to insure the production of an emulsion possessing the desired stability.

In the wet process, on the other hand, the resin is fused prior to or during the emulsification process, the mixture to be emulsified usually being maintained above the melting point of the particular resin employed during at least the major portion of the process. It is apparent that this method is especially suited to the preparation of emulsions at atmospheric pressures from resins having a melting or softening point below $100°$ C., that is, below the boiling point of water. However, by conducting the emulsification in a closed system, thus permitting the water employed to be maintained at any desired elevated temperature, without undue volatilization, butadiene resins possessing any desired softening point may be employed.

An alternative method for forming the emulsion comprises the addition of sufficient solvent to a high melting butadiene resin to lower its melting point sufficiently to permit it to be fused at a temperature below 100° C. The added solvent may then be removed from the finished product, if desired, by steam distillation, or by other suitable methods.

In a combination of the two types of processes, the resin may be powdered and partially emulsified by means of the dry process, after which the emulsification may be completed by means of the wet process.

In general, butadiene resin emulsions prepared by the wet process, or by a combination of the dry and wet processes, have a tendency to be more stable than those prepared by the dry process alone.

In order to form the emulsion, a suitable emulsifying agent is associated with the water and the butadiene resin to be emulsified. Emulsifying agents may be divided into three classes, namely, chemical, colloidal, and solid.

Referring now to chemical emulsifying agents, the majority of those which may be used for the emulsification of butadiene resins are of the polar type, one end of the molecule being hydrophilic (water attractive) and the other end being lipophilic (oil attractive) or hydrophobic (water repelling). The lipophilic portion of the molecule frequently consists of an aliphatic or aromatic chain or ring, or combination thereof, while the hydrophilic part frequently consists of one or more polar groups, such as —SO$_3$H, —SO$_3$Na, —COOH, —COOK, —COONH$_4$, —CONH$_2$, —CONHR, in which R is an alkyl, aryl, or alkylaryl group, and the like.

In general, therefore, the chemical emulsifying agents may be represented by the general formula $$A_nB_n$$

where A represents an alkyl, aryl, or aralkyl chain, B represents a polar group which may be organic, inorganic, or organic-inorganic in nature, and $n$ represents any integer, usually from 1 to 3. However, it is not represented that all compounds satisfying this formula are emulsifying agents.

When emulsifying agents of this type are added to a butadiene resin-water mixture, and the whole is violently agitated by any suitable means, the emulsifying agent is absorbed at the interface and orients itself so that the lipophilic part is in the oil phase and the hydrophilic part is in the water phase. The relative activity and mass of the respective hydrophilic and lipophilic portions of the emulsifying agent used determines, in large measure, the tendency to form resin-in-water or water-in-resin type emulsions.

This is well illustrated by a consideration of the emulsifying action of salts of the higher fatty acids, such as palmitic, oleic, and stearic, upon a mixture of butadiene resin and water. The ammonium, potassium, sodium, and other monovalent salts of these acids have a pronounced hydrophilic character and thus act as emulsifying agents to form resin-in-water emulsions, and the use thereof is to be preferred over the salts of the di- and trivalent metals which tend to form water-in-resin emulsions.

In addition to the salts of the fatty acids previously mentioned, the salts of other members of this class, such as margaric, linoleic, and linolenic acids, also may be used with good results. Fatty acids derived from drying oils, such as linseed, tung, and perilla, in the form of salts also are excellent emulsifying agents, as well as the salts of naturally occurring acids, such as rosin acid (abietic acid). In general, it may be said that the salts of the higher molecular weight fatty acids, particularly those containing more than eight carbon atoms, make excellent emulsifying agents for the preparation of butadiene resin emulsions. Examples of particularly good emulsifying agents of this class include sodium oleate, ammonium laurate, ammonium stearate, potassium oleate, sodium laurate, potassium laurate, sodium stearate, and potassium stearate.

In addition to the use of the metallic derivatives of the fatty acids as emulsifying agents for this purpose, it has been found that other salts, such as the ammonium derivatives and the compounds formed by reacting basic organic ammonium compounds such as a mono-, di-, or triethanolamine with the fatty acids, as well as other derivatives, such as the amides and amino derivatives, are eminently suited also. Quaternary ammonium salts, such as the reaction products of cetyl dimethyl amine with acids, such as hydrochloric acid are excellent emulsifying agents. The amine salts or esters of fatty acids of the type described, such as amino-stearin, are included within this class. All of the foregoing emulsifying agents are designated herein as "the salts of relatively high molecular weight organic acids."

Another class of active emulsifying agents comprises the sulfonic acid derivatives of hydrocarbons, such as alkyl sulfonic acids, as well as other compounds containing the sulfate or sulfonate group. Salts of these compounds, such as the sodium, potassium or ammonium salts, as well as the salts derived by reacting these compounds with organic bases, are particularly effective. Examples of such compounds are Turkey red oil (the sodium, potassium, or ammonium salt of the product obtained by treating castor oil with sulfuric acid), sodium lauryl sulfate, the sodium salts of the sulfonated alkyl naphthalenes, the sodium salts of sulfonated alkyl benzenes, toluenes, or xylenes, and the dioctyl ester of sodium sulfosuccinate.

Water-soluble sulfuric acid esters or derivatives of relatively high molecular weight aliphatic alcohols, as well as certain derivatives and salts thereof, for example, the alkali metal and ammonium salts, such as sodium lauryl sulfate, are excellent emulsifying agents for this type of emulsion also.

The foregoing compounds of sulfated or sulfonated hydrocarbons, and derivatives thereof are designated herein as "sulfonated hydrocarbon derivatives."

If desired, the emulsifying agents may be formed in situ. Thus, the lipophilic compound, for example, a fatty acid, such as oleic acid, may be dissolved in the resin and the compound forming the hydrophilic group, for example, the desired alkali, such as sodium hydroxide, may be dissolved in the water phase. Combining the two phases results in the formation of the desired emulsifying agent, in this case sodium oleate. As the formation of the emulsifying agent takes place at the interface, the high concentration of this material at the time of formation, and at the location where it can exert its optimum effect, very materially assists in the preparation of stable emulsions.

Particularly stable aqueous butadiene resin emulsions which are relatively insensitive to changes in temperature may be prepared by the use of emulsifying agents comprising compounds prepared from the relatively high molecular weight decomposition products of albumen in combination with relatively high molecular weight saturated or unsaturated fatty acids, or their derivatives or substitution products. An example of these materials is the oleic-acid amino-compound of the decomposition products of albumen.

The use of esters of polyvalent alcohols and saturated or unsaturated relatively high molecular weight fatty acids, such esters still containing non-esterified alcoholic OH groups, in combination with the foregoing emulsifying agents, further serves to stabilize the emulsions prepared therewith, particularly with reference to decreasing their tendency to flocculate upon the addition of hard water, that is, water containing calcium or magnesium sulfates. Examples of such agents are glycerol monostearate, propylene glycol mono fatty acid esters, and the glycerol mono- and di-esters of cocoanut oil fatty acids. The acid constituent may consist, for example, of halogen, oxy, or amino compounds of saturated or unsaturated fatty acids, while the alcoholic constituent may consist of polyvalent alcohols or their derivatives.

To summarize, the chemical emulsifying agents which may be used for the preparation of aqueous emulsions of butadiene resins may be listed as follows.

1. Aromatic sulfonates and salts thereof
2. Fatty alcohol sulfonates and salts thereof
3. Fatty acid soaps
4. Aromatic and aliphatic ether sulfonates and salts thereof
5. Aliphatic sulfonates and salts thereof
6. Polymeric sulfonates and salts thereof
7. Polymeric alcohols
8. Ester sulfonates
9. Quaternary ammonium salts The first four classes listed are, in general, better adapted to the preparation of stable aqueous emulsions of butadiene resins than the remainder of the classes listed.

Specific examples of emulsifying agents which may be used for the preparation of aqueous emulsions of the type described herein are isopropyl naphthalene sodium sulfonate, dioctyl sodium sulfo succinate, butyl phenyl phenol sodium sulfonate, dibutyl phenyl phenol sodium sulfonate, sodium stearyl sulfonate, alkyl phenylene sulfonate, sodium borosulfate of octadecenyl alcohol, $C_{13}$ alkyl benzene sulfonate, sodium sulfonate of acetynaphthone, naphthenic acid sulfonate, sodium oleate, and sodium myristate.

In certain cases, also, it may be found to be desirable to use two or more of the foregoing emulsifying agents for the preparation of butadiene resin emulsions in order to impart certain desirable characteristics to the resulting product.

Referring now to the colloidal emulsifying agents, those which may be used for the preparation of butadiene resin emulsions include proteins, carbohydrates, and albuminous materials of high molecular weight. Examples of such compounds are egg albumen, glue, casein, starch, and gelatine. Although these molecules possess some polar characteristics, the major portion of their emulsifying action undoubtedly is due to the adsorption of a thin film of the emulsifying agent at the interface, thus forming a protective membrane which retards the coalescence of the globules of the dispersed phase.

An additional factor which materially assists in the stabilization of the resin-in-water emulsions is the large increase in the viscosity of the dispersion medium caused by the addition of even relatively small portions of emulsifying agents of this type. This assists in retarding the Brownian movement which normally tends to slowly coalesce the individual globules of the dispersed phase.

The colloidal emulsifying agents which may be used, either alone or, preferably, in conjunction with chemical emulsifying agents, for the emulsification of butadiene resins may be listed as follows.

1. Synthetic and natural gums
2. Casein derivatives
3. Colloidal clays
4. Albumen and derivatives
5. Lecithins and associated compounds
6. Starches and dextrins
7. Glues and gelatines Alkaline derivatives of casein are particularly desirable for this purpose.

Specific examples of desirable colloidal emulsifying agents are polymerized poly-aryl sulfonic acid, polymerized alkyl-aryl sulfonic ester, sodium sulfonate of lauryl collamide, sodium sulfonate of myristyl collamide, seaweed alginate, methyl cellulose, and soybean lecithin.

Referring now to solid emulsifying agents, it has been pointed out previously that certain finely divided solids can be used as emulsifying agents for the preparation of aqueous butadiene resin emulsions. These materials exert their influence by distributing themselves at the interface. As the stabilization of the emulsion depends upon both phases wetting the solid surface, it is evident that the stability of the resulting emulsion is directly dependent upon the particle size of the desired emulsifying agent, as well as upon the amount of emulsifying agent employed. Examples of solid emulsifying agents which may be used for the preparation of aqueous butadiene resin emulsions are finely divided ferric hydroxide, finely divided arsenious sulfide, and finely ground silica. Silicious materials in general, such as clay, kieselguhr, bentonite, and the like, also may be employed for this purpose.

It is, of course, to be understood that any combination of the foregoing classes of emulsifying agents namely, chemical, colloidal, and solid, may be employed to prepare butadiene resin emulsions having desirable physical properties.

The use of a wetting agent or detergent, such as for example dibasic acid sulfonates, with any of the chemical emulsifying agents previously described, gives particularly satisfactory results. Generally speaking, wetting agents or detergents act to reduce the surface tension of the respective phases to permit the dispersed phase to become more finely subdivided and thus enhance the stability of the system.

In addition, wetting agents may be used, either alone or in combination with emulsifying agents, in conjunction with materials which act as protective colloids with particularly satisfactory results. Not only are the butadiene resin emulsions prepared in this manner more stable than the corresponding emulsions prepared without the use of protective colloids, but such emulsions may be prepared by the use of much smaller quantities of emulsifying agent than would be employed normally. Emulsions prepared by the use of wetting agents, or emulsifying agents, or both, in conjunction with protective colloids, generally show less tendency to cream or stratify.

In general, desirable butadiene resin emulsions may be obtained by the use of one or more surface active agents, such as wetting agents, dispersing agents, emulsifying agents, and detergents, in conjunction with protective colloids. The use of sulfated or sulfonated compounds, or derivatives thereof, as the surface active agent or agents gives particularly desirable results.

The use of a mixture comprising an emulsifying agent, a wetting agent, and a protective colloid will be found to give emulsions possessing very good stability and other desirable properties.

Among the protective colloids which may be used for this purpose are bentonite, gelatin, casein, glue, natural gums, such as gum ghatti, gum tragacanth, gum arabic, and the like, dextrin, and similar materials, as well as derivatives and modifications of these materials.

The pH of the emulsion also influences its stability. It has been found that for each emulsifying agent there exists a definite range of pH values within which the given emulsifying agent exerts its optimum stabilizing effect when used for the preparation of butadiene resin emulsions. Consequently, by the proper adjustment of the pH value of a given butadiene resin emulsion, an emulsion possessing unusual stability may be obtained.

The use of emulsifying agents and procedures of the foregoing character will in by far the larger number of cases result in the desired resin-in-water emulsions to the use of which in the coating or organic materials this invention more particularly relates.

The quantities of ingredients employed in preparing the emulsions to be used in accordance with this invention, namely, butadiene resin, emulsifying agent or agents, and water may be varied over very wide limits. In general, this will depend somewhat upon the adopted procedure of coating or impregnating the particular organic material, and upon the amount of resin which it is desired to associate with the material. In general, however, it has been found that the approximate practical upper limit for the concentration of butadiene resin in the finished emulsion is approximately 60 per cent by weight. The lower limit of the butadiene resin in the emulsion may be as low as desired, for example, 1 per cent or 2 per cent by weight.

The quantity of emulsifying agent rarely exceeds 20 per cent by weight of the resin employed; and in most cases, it will be found that 5 per cent to 10 per cent of the emulsifying agent is ample.

As pointed out in my first mentioned copending application, the emulsions can be further stabilized by the addition of materials which increase the viscosity of either of the phases, examples of such materials being sugars, albuminous materials, glues, gelatin, casein, and derivatives of resinous materials, such as the sodium salt of polymerized methacrylic acid, partially saponified polymerized methyl methacrylate, or methyl cellulose.

Among the various additives that may be incorporated in my butadiene resin emulsions, if desired, are the following: (1) other synthetic resins, such as resins prepared by the polymerization of other unsaturated hydrocarbons, vinyl chloride, vinyl acetate, acrylic acid and derivatives of acrylic acid, methacrylic acid, and derivatives of methacrylic acid, vinylidene compounds, unsaturated aldehydes, unsaturated ketones, as well as resins derived by the copolymerization of mixtures containing one or more of the foregoing; (2) derivatives of the foregoing resins, such as the sodium salt of polymerized methacrylic or acrylic acids; (3) natural resins, such as rosin, shellac, congo, dammar, kauri, elemi, pontianak, and chicle; (4) plasticizing agents, such as esters of phthalic acid, phosphoric acid esters, chlorinated diphenyl, and the like; (5) pigments; (6) fillers, such as wood flour, fabric waste, cotton linters, and the like; (7) coloring agents, such as dyes, lakes, and the like; (8) decorative pigments, such as chitin extracts, mercurous chloride flakes, pearl essence, and the like; (9) asphalts and pitches; (10) waxes, (11) drying oils, either raw or bodied; (12) solvents; (13) cellulosic plastics such as cellulose nitrate and acetate and the cellulose ethers; (14) gums, such as gum arabic, gum tragacanth, (15) oils such as aromatic oils; and the like, and (16) miscellaneous materials, such as gelatin, casein, glue, and the like.

Particularly desirable plasticizing agents are the high-boiling aromatic oils obtained as a by-product of the polymerization of oils obtained by the flash distillation or solvent extraction of petroleum oil gas tar, either with or without the application of further refining operations on said oils such as sulfuric acid washing and/or clay contacting. Such oils boiling above 200° C., and more particularly above 250° C., are preferred. Excellent results are obtained when oils boiling above 300° C. are employed.

Dimers, trimers, and/or other low molecular weight polymers of unsaturated hydrocarbons, such as dicyclopentadiene; dimers and/or low molecular weight polymers of indene; dimers and/or low molecular weight polymers of mixtures of coumarone and indene; and/or dimers and/or low molecular weight polymers of light oil and/or coal tar fractions such as, for example, fractions boiling in the range of 150° C. to 220° C. also are very desirable plasticizing agents.

Plasticizers are added to compositions of the type disclosed herein primarily to improve the pliability of such compositions, although it should be pointed out that this usually can be accomplished in a satisfactory manner by selecting a resin having a fairly low melting point, or even a liquid resin. The natural plasticizing agents present in such resins are excellent agents for retarding or preventing brittleness in the compositions described.

It will be understood, of course, that any desired combination of the foregoing types of additives may be employed, if desired. In certain cases, the added materials may take the place of the emulsifying agents normally employed, either wholly or in part.

In addition, the butadiene resin emulsions may be further modified for specific purposes by blending with a second emulsion, such as synthetic or natural rubber latices, or another resin emulsion.

The butadiene resin emulsion may be applied in any desired manner, such as by dipping, spraying, roller coating, and similar methods, or in the case of paper pulp, for example, the butadiene resin emulsion may be associated with the pulp in the beater. The quantity of resin applied in this manner can be varied over very wide limits in order to obtain any desired physical properties in the finished material.

After treating the organic material with the desired butadiene resin emulsion, the volatile materials may be removed in any desired manner, such as by the application of heat or otherwise.

Suitable methods for the application of heat comprise the use of ovens in which the treated material may be placed, or through which it may be passed continuously, or otherwise, as well as the use of infrared rays for this purpose. Another method comprises passing the treated material over hot calendering rolls.

An alternative method for removing the water comprises the addition of a coagulating agent, such as methyl alcohol, barium chloride, alum, ethyl alcohol, or acetone, which serves to flocculate the emulsion and deposit the butadiene resin directly upon the surface of the material. Any volatile material present then may be removed by suitable means, if desired.

While any desired emulsifying agent may be used in the preparation of the butadiene resin emulsion, and any means for coagulating the dispersed resin in the emulsion may be employed, a suitable choice of emulsifying agent or of coagulating means, or both, will have a considerable influence upon the physical appearance and properties of the finished product. For example, when ammonium salts such as ammonium caseinate or ammonium oleate, are employed as emulsifying agents, the subsequent heat treatment serves to remove the volatile constituent ammonia, leaving the residue from the emulsifying agent firmly adhering to the material. As such residues possess considerable water resisting properties, the water resistance of the finished material is correspondingly enhanced.

Similarly, when alkali metal or ammonium salts, such as sodium caseinate, sodium oleate, or ammonium laurate, are employed as emulsifying agents, the use of a heavy metal salt, for example barium chloride, as coagulant, results in the deposition of the corresponding heavy metal salt of the acidic portion of the emulsifying agent upon the surface of the material. As heavy metal salts of this type are comparatively water insoluble, they contribute to the improvement of the water resistance of the finished product.

Sizing or other textile or paper treating agents or materials, such as a rosin size, may be incorporated with the aqueous butadiene resin emulsion prior to its application to the material, if desired, or it may be applied to the material separately, in which case it is preferably applied prior to the application of the butadiene resin emulsion. The proportion of butadiene resin and sizing and/or filling materials may be varied at will in order to produce a final sheet or other product having the desired physical properties.

As pointed out previously, the butadiene resin may be precipitated on the desired surface by any suitable means, such as by the application of heat, which serves to remove the water and other volatile material, or by the addition of suitable coagulating agents, suitably followed by the application of heat to remove any volatile material present. An extension of this latter means involves the addition of milk to an aqueous butadiene resin emulsion as a coagulating agent, particularly in those cases in which an emulsifying agent capable of being decomposed by acids naturally formed in the milk, such as rosin soap, ordinary soaps, saponified waxes, and similar materials, has been employed. Milk is an aqueous dispersion of fat, which slowly decomposes with the formation of acidic substances. In consequence of the very slow formation of acid, a gradual flocculation of the resin takes place. This is particularly desirable in certain cases, such as those in which a uniform deposition of very fine resin particles over the surface to be covered is desired.

The type of film obtained when the aqueous butadiene resin emulsion is applied to the organic material, and the aqueous vehicle evaporated, depends on the temperature to which the treated material is exposed, either after or during the evaporation of the vehicle. In the event the water is removed at a temperature below the softening point of the resin, the organic material will be covered by a film of the resin comprising discrete particles. Such a covering is advantageous for many purposes, since it is relatively pervious.

The film comprising the discrete particles may be subsequently converted, if desired, into a continuous impervious film by heating the treated material above the softening point of the resin sufficient to cause the discrete particles to flow and weld together. Such a temperature may be furnished by an oven or drier, a heated roll, or a calender.

A similar continuous film of resin is also obtained when the aqueous vehicle is removed from the treated material at a temperature above the softening point of the resin.

In this connection it may be noted that coated organic sheet material possessing an unusually glossy surface may be prepared by heating the coated or impregnated material after the removal of the volatile materials present to a temperature sufficiently high to cause the butadiene resin to soften, thus smoothing out any inequalities in the surface of the coating. If desired, the coated material may then be run through cooled polishing rolls in order to produce an exceptionally good glossy surface.

The incorporation of a solvent having a boiling point above that of water in the aqueous butadiene resin emulsion prior to application will have the same effect. After the evaporation of the water present, the solvent exerts a leveling and smoothing action on the resinous coating before it has been completely removed from the coating film.

Paper, cardboard, and other fibrous materials of this type may be coated and/or impregnated by means of the aqueous butadiene resin emulsion in order to improve the gloss and finish of the material, as well as to improve its resistance to blocking and scuffing, ultra-violet light discoloration and heat discoloration, and to impart certain moisture and grease resisting properties to the material. Paper and fibrous materials of this type which have been treated with aqueous butadiene resin emulsions under conditions designed to form a continuous coating film have a smooth, glossy appearance and can be used in various applications in which a decorative paper is desired. By incorporating various dyes, coloring bodies, pigments, decorative pigments, fillers, and the like in the aqueous resin emulsions, decorative papers of almost any desired color, texture, and appearance may be prepared at will.

A major outlet for paper, cardboard, and fibrous materials in general which have been coated with an aqueous butadiene resin emulsion, followed by the removal of all volatile material, is in the preparation of packages and containers of various kinds. Paper stock coated in this manner is ideally suited for this purpose, as it can be impregnated sufficiently to impart almost any desired mechanical strength to the finished container. In addition, the coating is sufficiently moisture resistant, particularly if the dispersed particles have been welded by the application of heat or by the use of solvents as hereinbefore disclosed, or otherwise, to protect the contents of the container from contamination by external moisture or liquids in general. Moisture proof containers of almost any desired size and shape may be readily fabricated from such coated materials.

In addition, containers designed to hold certain liquid or liquid-containing products may be readily fabricated from such coated paper, cardboard, or fiber stock. Examples of such containers are milk bottles, soft-drink bottles, and containers for similar products. Butadiene resins are ideally suited for this purpose as they do not impart any odor or taste to the liquid or liquid-containing products in the containers.

It is, of course, to be understood that paper containers and packages may be coated with butadiene resin emulsions after fabrication.

For coating the usual size and type of paper stock, it has been found that coating weights of 3 to 10 ounces per ream is sufficient for ordinary purposes.

In addition to uncoated and unfilled paper stock, paper stock which has been coated or filled first with other materials, such as a casein-clay coated stock, may be used for this purpose.

Laminated paper or fiber products also can be prepared in a similar manner, the coated sheets being united either before or after the volatile materials have been removed from the coated surface. A particularly desirable procedure comprises coating a plurality of sheets, running the sheets separately through suitable drying ovens, and uniting the sheets immediately upon emerging from the drying ovens, at which point the coated surface is in a plastic condition. The multi-layered stock then is run through suitable rollers in order to thoroughly bond the constituent units together. An alternative procedure comprises heating the multi-layered stock in platens under suitable pressure. Such bonded or laminated products are eminently suited to the production of the containers previously referred to.

A suitable method for the continuous production of coated paper or other fiber stock is shown diagrammatically in Figure 1. The aqueous butadiene resin emulsion is placed in the container 1. A portion of this emulsion is picked up by the primary roll 2, the lower surface of which is in contact with the resin emulsion. The quantity of coating material permitted to remain on the primary roll is controlled by means of the adjustable doctor blade 3. This coating, in turn, is transferred to the secondary roll 4, which deposits it in an even, continuous layer upon the coating roll 5. Paper stock is continuously run over this roll from the raw paper stock roll, 9. The paper stock is pressed against the coating roll by means of the idler roll 6. The coated paper then passes over the heating unit 8 after which the finished paper is collected on a suitable roll 7. If desired, a set of smoothing rolls may be placed between the heating unit 8 and the finished paper roll 7 in order to impart a highly glossy surface to the finished sheet, although this usually will be found to be unnecessary.

It will be noted that the procedure just described produces a coated paper which has been finished on one side only. While this type of coated stock is suitable for a large number of uses, there are certain uses for which a paper coated on both sides is required.

Paper of this type can be prepared by means of the process outlined in Figure 2.

The aqueous butadiene resin emulsion in coating containers 11 and 19 is continuously transferred to the primary rollers 13 and 18, the quantity permitted to remain on the primary rolls being controlled by means of the adjustable doctor blades 12 and 20. The coating material is subsequently transferred to the secondary rolls 14 and 17, from which, in turn, it is transferred to the coating rolls 15 and 16.

The raw paper stock from the crude stock roll 24 passes over idler roll 25 and is continuously passed through the coating rolls 15 and 16, the coating being simultaneously transferred to the paper stock.

The coated paper then is passed through a heating oven or zone, 21 and 22, which serves to remove all volatile material from the coating film.

The finished paper then is passed over the idler roll 26 and is collected on the finished stock roll 23. If desired, a set of polishing rolls can be installed between the oven 21 and 22 and the idler roll 26 in order to impart a highly glossy surface to the finished sheet, although the use of such polishing rolls ordinarily can be dispensed with.

The process may be further illustrated by the following examples:

Example 1

A strip of unglazed paper is passed through an aqueous butadiene resin emulsion containing 25 per cent by weight of resin, after which it is passed through nip rolls to remove excess emulsion. The coated paper then is passed between heated calendering rolls in order to remove all traces of volatile material, after which it is passed between polishing rolls heated to a temperature somewhat above the softening point of the resin. A smooth glossy finish thereby is imparted to the paper.

Example 2

A strip of kraft paper stock is sprayed with an aqueous butadiene resin emulsion in which ammonium laurate has been employed as the emulsifying agent, said emulsion containing 25 per cent by weight of resin. The coated paper then is passed through a precipitating bath containing an aqueous solution of barium chloride, after which it is passed through nip rolls to remove excess solution. The coated sheet then is heated in an oven for a period of 10 minutes at a temperature of 140° C., after which it is passed through heated polishing rolls. A smooth, waterproof surface is thus imparted to the paper stock.

Example 3

A plurality of sheets are coated by the method outlined in Example 1. After passing between the final series of heated rolls, the sheets are placed on top of each other. They are then placed between heated platens and a pressure of, say, 2,000 pounds per square inch applied for a period of, say, 5 minutes at a temperature of, say, 100° C., after which the platens are cooled and the laminated block removed. A uniform, well cemented block of laminated paper is thus secured.

Butadiene resin impregnated sheets, boards, or finished fabric forms also may be prepared from any desired organic fibers, such as animal, or vegetable fibers, or mixtures of these fibers with mineral fibers, for example asbestos, by incorporating the resin in the form of an aqueous emulsion in the fibers, in loose or pulp form, prior to forming the desired sheets or other shapes.

The process may be carried out in any of the usual paper-making or other fiber treating units, such as those involving the use of a beater. The fibers are first treated in such units until they have reached the condition required to form a satisfactory sheet, such as on any standard paper or paper board unit. The aqueous butadiene resin emusion then is added to the fibers and the beating continued until a uniform mixture is secured.

An alternative method comprises agitating the fibers with the aqueous resin emulsion in the usual type of agitating equipment. After thorough mixing, the butadiene resin is deposited upon the fibers by any desired method, such as by heating to remove the volatile materials present. This can be readily accomplished, also, by sheeting the pulp and removing the volatile material present by the application of heat, such as by passing through a heated oven or between heated rolls. Alternatively, one of the coagulating agents previously mentioned may be used, suitably in conjunction with the application of heat to remove any volatile materials present. It will, of course, be clear that in addition to the resin emulsion, other materials such as size, fillers, coloring agents, and the like may be present during the agitation of the pulp and resin in the beater or other equipment.

The finished product may be utilized in any desired manner. Thus, it may be sheeted in the usual manner, after which the sheet may be heated under pressure between platens, or it may be passed through heated calendering rolls, in order to form a smooth, glossy sheet or board. In addition, a wide variety of formed objects, such as shoe toe boxes, shoe heel forms, and the like, may be made in a similar manner, such as by forming the coated fibers, wet mat, or felt, or the finished sheet or board, in a suitable mold, form, or press.

Sheets, boards, and finished fabric articles formed in this manner possess many desirable properties, such as increased resistance to fracture, excellent electrical and dielectric properties, water resistance, excellent resistance to chemical attack, such as by acids, bases, and similar materials, and excellent mechanical properties in general. The latter is due to the outstanding latent flexibility and adhesive properties of the butadiene resin.

The invention is more fully illustrated by means of the following example.

*Example 4*

Cellulose fibers are placed in a suitable beater and processed until they are sufficiently disintegrated and conditioned. Sufficient alkali then is added to bring the mixture to a fairly alkaline condition in order to guard against any premature coagulation of the resin emulsion.

Approximately 40 parts by weight of butadiene resin, in the form of an aqueous emulsion then is added to 100 parts by weight of the fibers and the whole agitated until a uniform mixture has been obtained, after which sufficient alum is added to bring the pH of the solution to between 4.0 and 5.0. The pulp then is deposited in the form of a wet mat, after which it is wet pressed, dried, and then pressed between platens heated to a temperature of, say, 100° C. for a period of, say, 5 minutes at a pressure of, say, 2,000 pounds per square inch. A smooth, glossy sheet is obtained.

Butadiene resin emulsions also are ideally suited for coating or impregnating textile fibers, threads, and fabrics. In general these materials are coated or impregnated to improve their hand, general appearance, resistance to shrinkage, crease resistance, crush resistance, and/or water resistance.

The use of present coating systems for impregnating textile materials is unsatisfactory in certain cases. Thus, for example, the use of urea-formaldehyde resins, which have found wide applicability in the textile coating field in general, for impregnating cotton shirting has been found to lead to the early breakdown and complete destruction of the fabric. This is due to the absorption of chlorine by the resin during the chlorine bleaching process universally employed in laundries, probably forming urea hydrochloride or resin-urea hydrochloride, followed by the decomposition of this intermediate during the subsequent ironing operation, liberating chlorine or hydrogen chloride. The presence of these materials on the surface of the fiber at the temperatures prevailing during the ironing operation (500° F.) rapidly destroys the cotton fiber and leads to a very early destruction of the fabric.

The use of butadiene resin, which is completely inert, for this purpose, results in a fabric which has a longer life-expectancy than the uncoated fabric.

Illustrative of the textile materials which may be improved by the application of butadiene resins in the form of aqueous emulsions are cotton, wool, linen, silk, artificial silk, such as cellulose acetate, regenerated cellulose such as viscose, nitrate cellulose, cuprammonium cellulose, and the like, polyamide fibers and fabrics, vinyl chloride-vinyl acetate fibers and fabrics, and casein fiber and fabrics.

The butadiene resin may be used to coat or impregnate the fabric in any desired state or stage of manufacture. A satisfactory method involves the application of the butadiene resin in the form of an aqueous emulsion to the threads of the desired textile material prior to the weaving or other forming operation. A second method involves the application of the aqueous butadiene resin emulsion to the woven fabric, while a third method comprises the application of the butadiene resin, in the form of an aqueous emulsion, to the finished garment.

In general, it has been found to be more satisfactory to apply the resin to the woven fabric, as such material is normally available in the form of fairly large strips or pieces. Such units can be treated in a continuous manner, thereby insuring the production of a coated or impregnated material of uniform quality.

A satisfactory procedure for applying an aqueous butadiene resin emulsion to a strip of woven goods is shown diagrammatically in Figure 3.

The woven fabric 31 passes over idler roll 32 and under rolls 34 and 35, thereby being brought in contact with the resin emulsion in the coating solution pan 33. The saturated fabric then passes between nip rollers 36 and 37, which removes the surplus emulsion contained in the fabric. By accurately adjusting the clearance between these rolls, any desired coating weight may be obtained.

The coated fabric then passes over idler roll 38 and through the heated calendering rolls 39, which serve to remove all volatile material present, as well as to impart the desired finish to the coated fabric. The finished material then passes over idler roll 40 and is collected on roll 41.

An alternative procedure is shown diagrammatically in Figure 4.

The butadiene resin emulsion coating is placed on the fabric in a manner similar to that described previously, after which the coated fabric is passed over idler rolls 38 and 49. The fabric then passes under rolls 50 and 51, thereby coming in contact with a coagulating solution contained in pan 52, after which it is passed between nip rollers 53 and 54 which serve to remove the excess liquid present. The coated fabric subsequently passes over idler roll 55 and through the heated calendering rolls 56. All volatile materials present are removed in the calendering rolls, and the desired surface gloss or appearance is imparted to the fabric. The fabric subsequently is passed over idler roll 57 and is collected on roll 58.

The finished fabric may be treated under pressure at elevated temperatures, if desired, in order to secure increased penetration and adherence of the resin to the fabric, as well as to insure the production of a highly glossy surface. In order to secure optimum results, a temperature substantially above the initial softening point of the resin is preferably employed. If desired, this can be accomplished in a continuous manner by passing the coated fabric through calendering rolls which are maintained at the desired elevated temperature.

As previously pointed out, the addition of a suitable wax or waxes to the butadiene resin emulsion has been found to be desirable in certain cases. This results in the production of a thin film of wax over the coated surface of the material, which facilitates the stripping of the coated fabric from the hot calendering rolls. The wax may be subsequently removed from the finished fabric, if desired, by polishing or similar methods.

Fabrics which have been impregnated with a butadiene resin, or mixtures of butadiene resin with other materials, by any of the foregoing processes may be used for the preparation of crease or crush proof garments, for the preparation of garments or other finished products possessing enhanced resistance to shrinking, or for the preparation of waterproof garments. In addition, they may be used for a variety of other purposes, such as for the fabrication of tents, netting, awnings, and the like.

A further extension of the use of butadiene resin emulsions for coating fabrics lies in coating finished articles of apparel, or other finished fabric products, particularly when it is desired to impart a certain amount of stiffness, or other desired properties to the finished article. Examples of such articles are collars, cuffs, plaits of shirts, neckties, and the like.

The procedure comprises coating or impregnating the desired article, or the several plies comprising the finished article, with an aqueous emulsion of a butadiene resin, either alone or in combination with other ingredients, such as, for example, another resin, followed by the removal of the volatile constituents present, such as by the application of heat, for example, with the conventional laundry iron. An alternative method comprises the coagulation of the resinous material on the surface or within the interstices of the fabric by the use of suitable coagulating agents followed by ironing, if desired.

In either case, the coated article is usually further treated by the application of heat and pressure in order to secure complete penetration of the resinous material within the interstices of the fabric, as well as to form a glossy surface on the coated article. This treatment can be carried out by the use of heated platens, hot calendering rolls, or the like. In the case of multi-ply articles, such as collars or cuffs, this treatment also serves to cement the various plies together in a satisfactory manner.

Any desired quantity of resin may be incorporated in the finished fabric. For most purposes, however, it has been found that from 2 to 3 ounces of resin per yard of fabric is sufficient.

A preferred embodiment of the invention comprises the use of a butadiene resin having a softening point above that of boiling water (212° F.) but below that ordinarily employed in ironing operations, namely, 300° F. This enables the garment to be laundered without causing the resin to soften or flow, but permits it to flow during the ironing operation, thus enabling the operator to secure a smooth, even appearance.

The process is applicable to any desired type of fabric, such as linen, cotton fabrics, such as broadcloth, madras, oxford cloth, and the like, silk, artificial silk, wool, polyamide fabrics and similar materials.

The application of butadiene resins to textiles in the form of aqueous emulsions is illustrated by the following examples.

*Example 5*

A strip of cotton fabric is immersed in an aqueous butadiene resin emulsion, in which ammonium laurate has been used as the emulsifying agent. The coated strip then is passed through suitable rolls to remove excess coating material, after which it is heated for a period of, say, 10 minutes at a temperature of, say, 100° C. to remove all volatile material. The coated fabric subsequently is passed through heated rolls, whereupon it acquired a bright, even, glossy appearance.

*Example 6*

A strip of cotton fabric is immersed in an aqueous resin emulsion, in which ammonium laurate has been used as an emulsifying agent. The coated strip is passed through squeeze rolls to remove the excess coating material present, after which it is slowly passed through an aqueous barium chloride solution which served to precipitate the resin on the surface, as well as within the interstices, of the fabric. The pH of this solution is maintained at 4.0–5.0.

The coated strip is passed through suitable rolls to remove the major portion of the excess water present, after which it is passed through heated rolls to remove all traces of volatile material. A bright, even, glossy fabric is thus secured.

*Example 7*

A plurality of fabric strips which have been coated with butadiene resin according to the method outlined in Example 5 are placed between heated platens and subjected to a pressure of say, 2,000 pounds per square inch at a temperature of, say, 105° C. for a period of, say, 5 minutes, after which the platens are cooled and the fabric pile removed. The piles are found to be securely attached to each other, and the surface of the material presents a smooth, slightly glossy appearance.

While the process has been described with particular reference to the application of butadiene resins to organic fibers in the form of aqueous emulsions, it is to be understood that the resin might be applied by other methods, such as by the use of a solution of the butadiene resin in a suitable solvent, or by the application of the resin in molten form, or otherwise.

To summarize, the essential feature of this invention is the provision of coated organic fiber or organic fiber products, such coating comprising a resin obtained by the polymerization of butadiene, or of a mixture of butadiene with lesser quantities of other unsaturated hydrocarbons, and the coating preferably being applied in the form of an aqueous butadiene resin emulsion.

In the specification and in the claims, the term "butadiene resin," unless otherwise modified, is intended to designate the resinous material obtained upon the polymerization of butadiene, either alone or in the presence of olefines, aromatic hydrocarbons, and/or other unsaturated or reactive materials, the resulting resin being composed of a preponderating portion of butadiene polymers and copolymers, or by the polymerization of a light oil butadiene fraction containing lesser proportions of butylenes.

Considerable modification is possible in the selection of the butadiene resin emulsion employed, as well as in the methods of applying the same to the organic material, without departing from the essential features of the invention.

Therefore, changes, omissions, additions, substitutions, and/or modifications may be made within the scope of the claims without departing from the spirit of the invention.

I claim:

1. The method of making coated organic fiber material which comprises bringing said fiber material into contact with an aqueous emulsion of a resinous polymer of butadiene in which the polymer is in the dispersed phase, removing the volatile constituents therefrom to leave the polymer deposited on said fiber material, and thereafter heating the product above the melting point of the polymer to form a continuous film of polymer on said fiber material, said polymer resulting from the polymerization of a hydrocarbon mixture containing butadiene as at least 75% of the total diolefine material present therein in the presence of boron trifluoride under conditions such that the total concentration of unsaturated hydrocarbon material present is from 10 to 80% by weight of the total material present with butadiene constituting the preponderating unsaturated hydrocarbon present, the quantity of boron trifluoride is between 0.1% and 5.0% by weight of the total unsaturated material present, and the temperature is maintained between −100° C. and −10° C., and said polymer being characterized by having a definite and reproducible softening point at least as high as 60° C., and by being compatible with drying oils.

2. The method of making coated organic fiber which comprises bringing said fiber into contact with an aqueous emulsion of a resinous polymer of butadiene in which the emulsifying agent is an ammonium compound of a fatty acid and in which the polymer is in the dispersed phase, heating said fiber to evolve ammonia from said compound and to deposit the polymer and the fatty acid of said compound on said fiber, and removing the volatile constituents from said fiber, said polymer resulting from the polymerization of a hydrocarbon mixture containing butadiene as at least 75% of the total diolefine material present therein in the presence of boron trifluoride under conditions such that the total concentration of unsaturated hydrocarbon material present is from 10 to 80% by weight of the total material present with butadiene constituting the preponderating unsaturated hydrocarbon present, the quantity of boron trifluoride is between 0.1% and 5.0% by weight of the total unsaturated material present, and the temperature is maintained between −100° C. and −10° C., and said polymer being characterized by having a definite and reproducible softening point at least as high as 60° C., and by being compatible with drying oils.

3. The method of making coated organic fiber which comprises bringing said fiber into contact with an aqueous emulsion of a resinous polymer of butadiene in which the emulsifying agent is a monovalent salt of a fatty acid and in which the polymer is in the dispersed phase, adding as a coagulating agent an inorganic salt capable of forming an insoluble salt with the fatty acid of said monovalent salt, and removing volatile constituents from said product to leave said polymer and said insoluble salt deposited on said fiber, said polymer resulting from the polymerization of a hydrocarbon mixture containing butadiene as at least 75% of the total diolefine material present therein in the presence of boron trifluoride under conditions such that the total concentration of unsaturated hydrocarbon material present is from 10 to 80% by weight of the total material present with butadiene constituting the preponderating unsaturated hydrocarbon present, the quantity of boron trifluoride is between 0.1% and 5.0% by weight of the total unsaturated material present, and the temperature is maintained between −100° C. and −10° C., and said polymer being characterized by having a definite and reproducible softening point at least as high as 60° C., and by being compatible with drying oils.

FRANK J. SODAY.

REFERENCES CITED

The following references are of record in the file of this patent:

UNITED STATES PATENTS

| Number | Name | Date |
| --- | --- | --- |
| 2,170,755 | Hanson | Aug. 22, 1939 |
| 2,309,090 | Bauer et al. | Jan. 26, 1943 |
| 2,314,820 | Fairbanks | Mar. 23, 1943 |
| 1,646,605 | Wescott | Oct. 25, 1927 |
| 1,864,078 | Luther et al. | June 21, 1932 |
| 2,045,410 | Richter et al. | June 23, 1936 |
| 2,077,017 | Schacht | Apr. 13, 1937 |
| 2,248,107 | Meisenburg et al. | July 8, 1941 |
| 2,281,613 | Wollthan et al. | May 5, 1942 |
| 2,184,320 | Simpson | Dec. 26, 1939 |
| 1,901,044 | Schmidt et al. | Mar. 14, 1933 |
| 2,238,165 | Ellis et al. | Apr. 15, 1941 |
| 2,273,880 | Mitchell | Feb. 24, 1933 |
| 2,346,791 | Rummelsburg | Apr. 18, 1944 |
| 2,366,219 | Soday | Jan. 2, 1945 |

FOREIGN PATENTS

| Number | Country | Date |
| --- | --- | --- |
| 278,486 | German | Sept. 26, 1914 |